United States Patent [19]
Cook et al.

[11] Patent Number: 5,681,028
[45] Date of Patent: Oct. 28, 1997

[54] VALVE ASSEMBLY

[75] Inventors: William D. Cook, Sherman Oaks; Raymond T. Engelhardt, Jr., Canyon Country, both of Calif.

[73] Assignee: Emhart Inc., Newark, Del.

[21] Appl. No.: 546,640

[22] Filed: Oct. 23, 1995

[51] Int. Cl.$^6$ .................................................. F16K 11/06
[52] U.S. Cl. ..................... 251/170; 251/192; 137/625.47; 137/454.5
[58] Field of Search ............................ 137/801, 625.47, 137/625.46, 454.6, 454.5; 251/170, 192, 363

[56] References Cited

U.S. PATENT DOCUMENTS

| | | |
|---|---|---|
| 3,780,758 | 12/1973 | DeVries . |
| 3,807,455 | 4/1974 | Farrell . |
| 3,831,621 | 8/1974 | Anthony et al. . |
| 3,913,612 | 10/1975 | Tolnai . |
| 4,331,176 | 5/1982 | Parkison . |
| 4,611,788 | 9/1986 | Thomsen ................... 251/363 |
| 4,651,770 | 3/1987 | Denham et al. . |
| 4,678,002 | 7/1987 | Valley . |
| 4,738,277 | 4/1988 | Thomas . |
| 4,793,375 | 12/1988 | Marty . |
| 4,821,765 | 4/1989 | Iqbal . |
| 4,823,832 | 4/1989 | Rodstein . |
| 4,880,209 | 11/1989 | Bernat . |
| 4,896,693 | 1/1990 | Rodriguez . |
| 4,901,749 | 2/1990 | Hutto . |
| 4,903,725 | 2/1990 | Ko . |
| 4,924,903 | 5/1990 | Orlandi . |
| 4,966,186 | 10/1990 | Rodstein . |
| 4,966,187 | 10/1990 | Wah . |
| 5,010,917 | 4/1991 | Iqbal . |
| 5,050,633 | 9/1991 | Tarnay et al. . |
| 5,094,258 | 3/1992 | Orlandi . |
| 5,103,857 | 4/1992 | Kuhn et al. . |
| 5,107,884 | 4/1992 | Orlandi . |
| 5,174,324 | 12/1992 | Chrysler . |
| 5,348,042 | 9/1994 | Wagner et al. . |
| 5,355,906 | 10/1994 | Marty et al. .................... 137/456.6 X |
| 5,365,978 | 11/1994 | Woods . |
| 5,398,717 | 3/1995 | Goncze . |

FOREIGN PATENT DOCUMENTS

| | | |
|---|---|---|
| 116246 | 7/1987 | Taiwan . |
| 137462 | 8/1989 | Taiwan . |

Primary Examiner—Kevin Lee
Attorney, Agent, or Firm—J. Bruce Hoofnagle

[57] ABSTRACT

A valve assembly 20 includes a housing or bonnet 22 and a stem 24. The valve assembly 20 further includes a thrust washer 26, an O-ring 28, a reversible stop 30 and a retainer 32. A coupler 34, a rotatable ceramic disk 36, a fixed ceramic disk 38 and a bottom seal 40 complete the components of the valve assembly 30. The rotatable disk 36 is assembled by a tight fit with the coupler 34 which, in turn is assembled with a drive bar 90 of the stem 24 by a tight fit. The assembled stem 24, coupler 34 and rotatable disk 36 are assembled within a bore 52 of the housing 22 with a shank portion 74 of the stem 24 extending outward from an opening 56 of the housing 22. The fixed disk 38 is assembled fixedly within the bore 52 of the housing 22 in facing engagement with the rotatable disk 36. The seal 40 is assembled within an opening 54 of the housing and is placed in sealing and retaining engagement with the fixed disk 38. The retainer 32 is placed on the exposed shank portion 74 of the stem 24 and the reversible stop 30 is moved over the shank portion 74 and past the retainer 32 for engagement with splines 82 on the shank portion. The retainer 32 precludes unintentional removal of the stop 30 from the stem 24 while allowing intentional removal thereof.

6 Claims, 10 Drawing Sheets

VALVE ASSEMBLY

BACKGROUND OF THE INVENTION

This invention relates to a valve assembly and particularly relates to a non-rise valve assembly.

Faucets which are typically used in a lavatory or a kitchen may use a valve with a single-handle control or a two-handle control. In a two-handle valving arrangement, the valves are located on each side of a spout of the faucet and are referred to as the left side valve, for controlling the supply of hot water, and the right side valve for controlling the supply of cold water. For many years, and to the present, one type of two-handle valve which has been in use includes a stem which is threadedly mounted in a bonnet. When either of the handles of the faucet is turned to open the respective valve, the stem is threadedly operated and thereby rises from its closed position because of its threaded mounting to separate a compliant washer from its closed seat to thereby allow water to flow past the seat and eventually from the spout.

Another type of valve used in a two-handle faucet is a non-rise valve and employs two ceramic disks which are always in interfacing engagement and which are formed with openings to facilitate the flow of water therethrough. When the openings of the disks are not aligned in any respect, the valve is closed to prevent the flow of water therethrough. When the valve handle and associated stem are turned, one of the disks which is attached to the stem is rotated relative to the other disk while the two disks remain in interfacing engagement. Eventually, the openings of the disks are aligned and water is allowed to flow through the openings and out of the spout. In this type of valve, the stem of the valve does not rise as the valve is opened, in contrast to the valve with the threadedly mounted stem noted above. A few examples of the many valves of the ceramic type are disclosed in U.S. Pat. Nos. 3,780,758; 3,831,621 and 5,174,324.

Generally, in ceramic valves of this type, the stem is freely rotatable within the bonnet in a clockwise direction and a counterclockwise direction. Therefore, a given design of a ceramic valve could be used on both sides of a two-handle faucet, that is as a right side valve and as a left side valve to provide the turning direction typically associated with a cold water valve on the right side of the faucet and a hot water valve on the left side of the faucet. However, a turning limit stop must be employed to limit the turning of the valve in each direction to one-quarter of a full turn. In order to take advantage of the premise of using ceramic valves of a common design on both sides of the faucet, a reversible stop is used with each valve to limit the turning of the stem in one direction or the other depending on whether the valve is being used on the right side or the left side of the faucet. An example of a reversible stop which is used for this purpose is disclosed in U.S. Pat. No. 3,831,621.

When assembling the components of a ceramic valve of the type noted above, it is critical that the components be assembled in the proper relationship and orientation, otherwise the valve will not function in the manner intended. Typically, the components of the valves are assembled in a factory to form the valves. During the assembly process, the reversible stops are assembled so that each valve is either a hot water or a cold water valve and the valves are segregated accordingly. A hot water valve is then assembled into one of a pair of spaced end bodies on opposite ends of an underbody which is to the left of a center body thereof. A cold water valve is then assembled into the other end body which is to the right of the center body. The underbody is then assembled with other elements to form a faucet. The faucet is packaged and shipped, eventually, to an installation site where it is installed in a plumbing system. Thus, it is important that some provision be made to insure that the reversible stop is assembled in the proper manner to provide a hot water or a cold water valve so that, when that valve is assembled with the underbody, it is assembled in the appropriate end body thereof.

During the period immediately following the assembly of the components of the valve, the valve is transported within the factory to various stations for further processing. Also, individual valves may be packaged and sold as replacement units for installation with existing, previously installed faucets.

Current techniques and facilities for retaining the assembled reversible stop with the valve assembly, typically include elements which require tools to insert and remove the stop. This requires that the installer carry appropriate tools necessary for such actions. In the factory as well as at the installation site, provision must be made for retaining the reversible stop of the valve in assembly during periods of handling, shipment, storage, and ultimate assembly with other elements of a faucet at the factory or installation sites. In addition, provision must be made for facilitating easy removal of the stop.

With respect to the valves which are installed as replacements in existing faucets, provision must be made to insure that, when replacing a hot water valve or a cold water valve, the reversible stop is assembled in the appropriate manner for the valve to function accordingly. Of course, the same provision must be made to insure the appropriate assembly in the factory.

Currently, a bottom seal element is assembled at the bottom of two-handle valve assemblies of the type described above. The bottom seal must be composed of a material which provides a water-tight seal at the bottom of the valve assembly while placing a limited stress on valving components which allow the valve assembly to be operated with relative and comfortable ease. The bottom seals currently used include a compliant member which is composed of a relatively expensive material. Thus, it is important that provision be made for providing an effective bottom seal which is relatively inexpensive.

At times, a homeowner may wish to convert a faucet from a knob-handle unit to a lever-handle unit. In this instance, only the knobs are removed and replaced by levers. When only knobs are used, the reversible stops are situated within the valve assembly in a precise manner to accommodate the conventional turning for the hot and cold water valves in the same direction, that is clockwise to close for both the hot and cold water valves. When levers are used, the hot and cold levers extend in generally opposite directions from each other when the valve is fully closed. When opening the lever-operated valves, the hot and cold valves are conventionally turned in opposite directions. For example, the cold lever is turned in a clockwise direction and the hot lever is turned in a counterclockwise direction to open the valve. Thus, to open the hot water valve for the knob assembly, the knob is turned in a counterclockwise direction, while to open the hot water valve for the lever assembly, the lever is turned in a counterclockwise direction. Therefore, provision must be made for easily reversing the hot water valve assembly when converting from a knob assembly to a lever assembly, or vice versa, and for insuring that the reversible stop is properly oriented to accommodate such change.

In view of the above-noted provisions, there is a need for a valve assembly which can be assembled in an efficient manner while insuring that a reversible stop thereof is properly assembled for the valve to function in the intended manner. In addition, there is a need for facilities which provide for the easy assembly and disassembly of the reversible stop. Further, there is a need for facilities which allow for the easy and comfortable operation of the valve assembly while providing necessary sealing in appropriate areas of the valve assembly.

SUMMARY OF THE INVENTION

In view of the foregoing needs, it is an object of this invention to provide a valve assembly having facility for insuring that components of the valve are assembled in an intended manner for proper operation thereof.

Another object of this invention is to provide a valve assembly having facility for insuring that components of the valve assembly may be easily assembled and disassembled.

Still another object of the invention is to provide for easy and comfortable operation of the valve assembly while providing necessary sealing in appropriate areas.

With these and other objects in mind, this invention contemplates a valve assembly which includes a housing and a stem mounted within the housing for free rotation relative thereto. A first end of the stem extends from a first opening of the housing. A first fluid-flow valve element is located within the housing and is coupled to a second end of the stem for rotation therewith. The first valve element is formed with a surface which is in facing engagement with a first surface of a second fluid-flow valve element fixedly attached within and to the housing adjacent a second end of the housing. A retainer is assembled at least partially within the second opening of the housing to assist in retention of the stem, the first valve element and the second valve element within the housing. The retainer is formed with interfacing structure which interfaces with a Second surface of the second valve element with only a portion of the interfacing structure in engagement with the second surface of the second valve to apply a prescribed force against the second surface of the second valve element to allow the turning of the stem and the first valve element relative to the second valve element while continuing to function as the second retainer.

This invention further contemplates a valve assembly which includes a housing and a stem mounted within the housing for free rotation relative thereto. A first end of the stem extends from a first opening of the housing and is formed with structure for supporting a reversible stop element in a complementary manner. The reversible is formed with indicating structure on one surface thereof to provide indication of the orientation of the stop. A first fluid-flow valve element is located within the housing and is coupled to a second end of the stem for rotation therewith. The first valve element is formed with a surface which is in facing engagement with a surface of a second fluid-flow valve element fixedly attached within and to the housing adjacent a second end of the housing. A retainer is assembled on the stem to preclude unintentional disassembly of the stop element from the stem.

Other objects, features and advantages of the present invention will become more fully apparent from the following detailed description of the preferred embodiment, the appended claims and the accompanying drawings.

DETAILED DESCRIPTION OF THE PREFERRED EMBODIMENT

Figure 1:
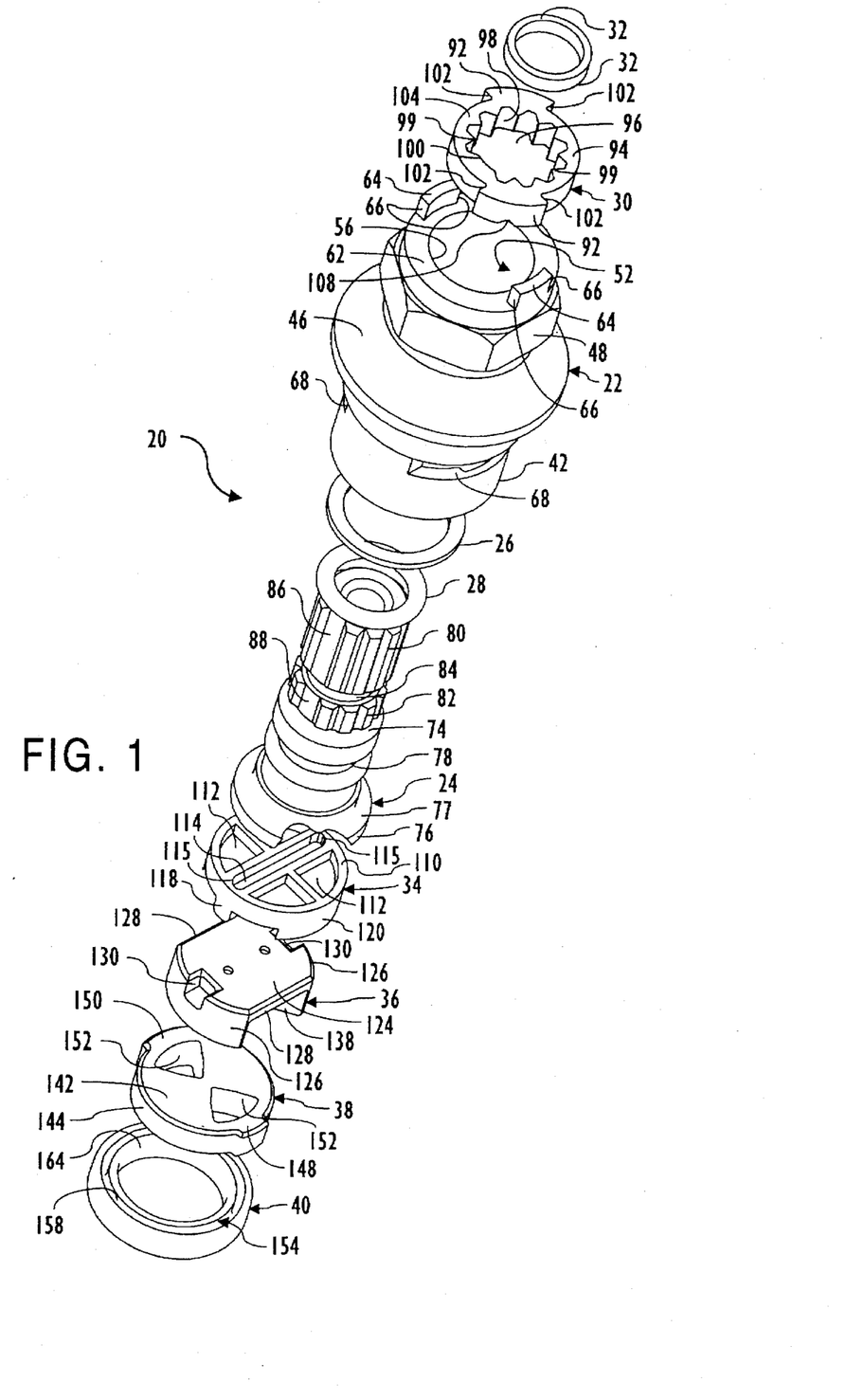
FIG. 1 is an exploded perspective view showing a valve assembly in accordance with certain principles of the invention.

Referring to FIG. 1, a valve assembly 20 includes a housing or bonnet 22 and a stem 24, both of which are composed of a copper alloy such as, for example, brass. The valve assembly 20 further includes a thrust washer 26, an O-ring 28, a reversible stop 30, which is composed of stainless steel, and a retainer 32, composed of a resilient material such as, for example, rubber. A coupling 34, a rotatable ceramic disk 36, a fixed ceramic disk 38 and a bottom seal 40, composed of an EPDM rubber, complete the components of the valve assembly 20. It is noted that other materials could be used without departing from the spirit and scope of the invention.

Figure 3:
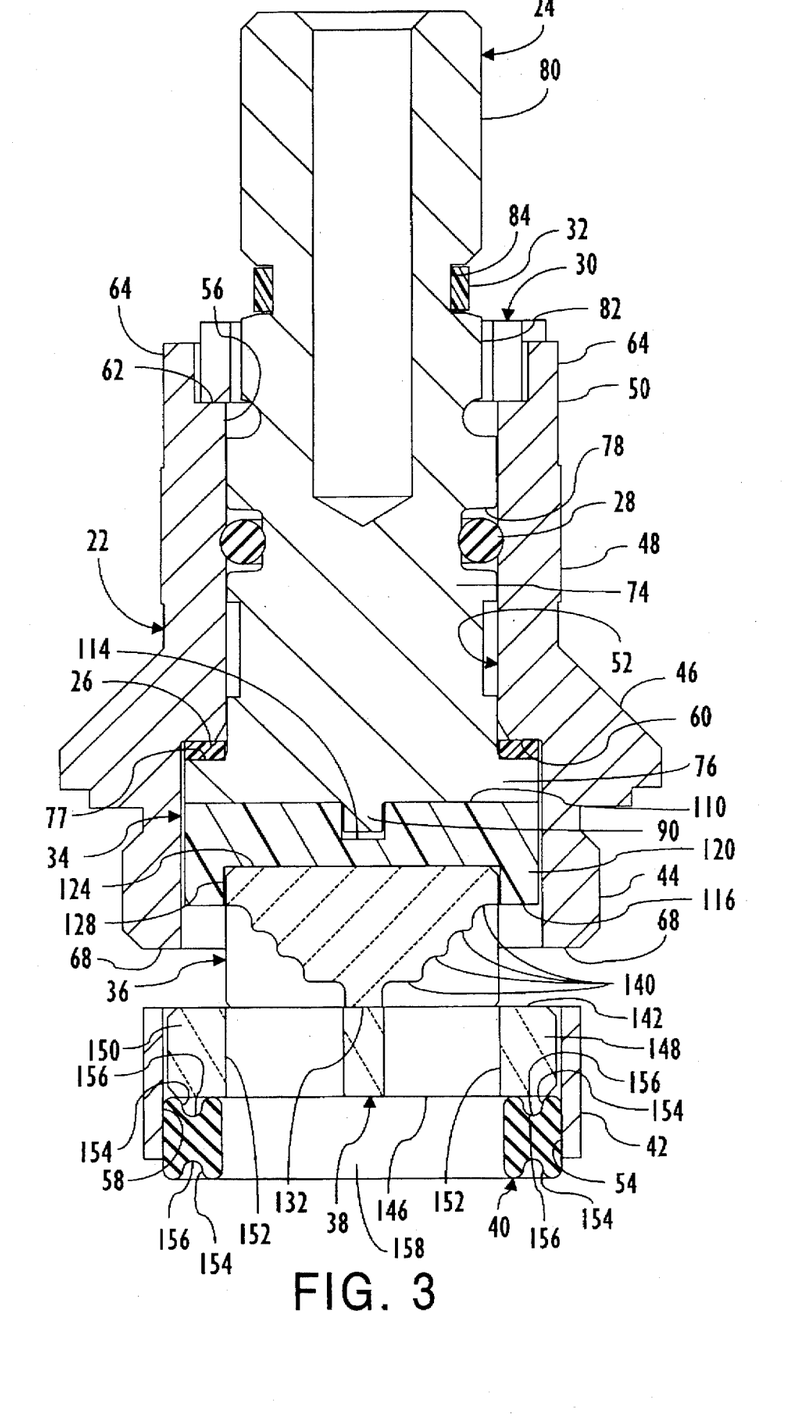
FIG. 3 is a sectional view showing structural features of the valve assembly of FIG. 1 in accordance with certain principles of the invention.
Figure 4:
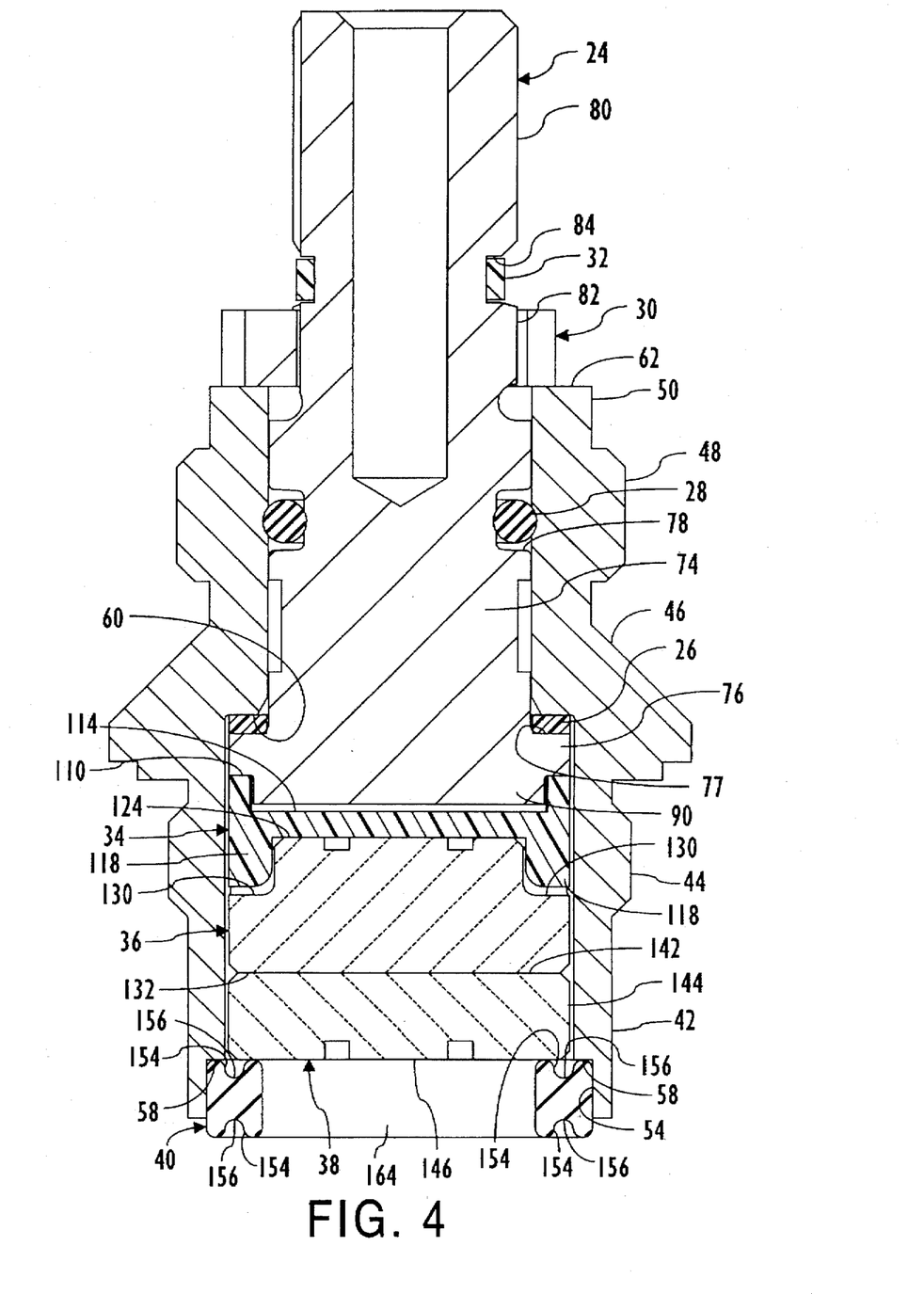
FIG. 4 is a sectional view showing structural features of the valve assembly of FIG. 1 in accordance with certain principles of the invention.
Figure 5:
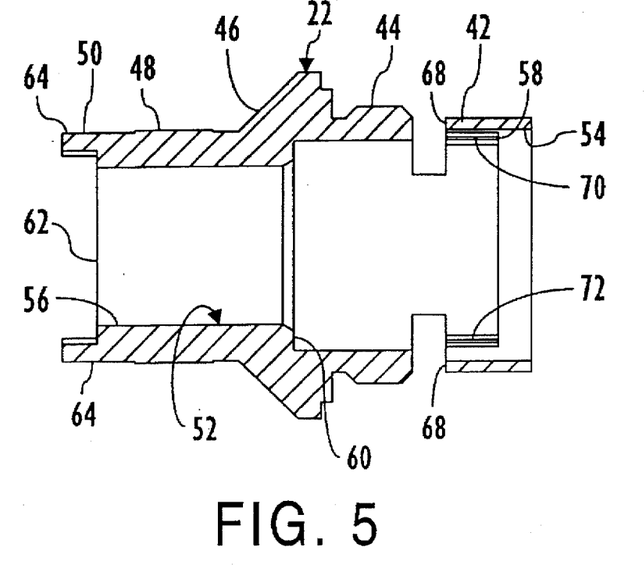
FIG. 5 is a sectional view showing a housing or bonnet of the valve assembly of FIG. 1 in accordance with certain principles of the invention.

As shown in FIGS. 3, 4 and 5, the housing 22 is formed with a lower cylindrical section 42, a threaded section 44, an intermediate flared section 46, a hexagonal section 48 and an upper cylindrical section 50. The housing 22 is formed with a bore 52 which extends axially therethrough from a lower opening 54 to an upper opening 56. A first shoulder 58 is formed in the bore 52 near the opening 54 and a second shoulder 60 is formed in an intermediate portion of the bore. An end surface 62 is formed on the housing 22 and surrounds the upper opening 56 of the bore 52.

Figure 6:
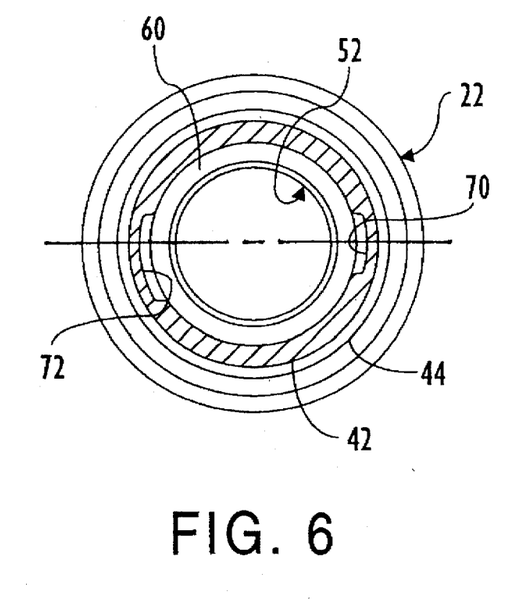
FIG. 6 is a sectional view showing structural features of the housing of FIG. 5 in accordance with certain principles of the invention.

A pair of opposed stop tabs 64 having stop surfaces 66 (FIG. 1) are formed with and extend in an axial direction from the end surface 52. As shown in FIGS. 1, 2, 3 and 5, a pair of fluid-flow windows 68 are formed through opposed portions of the lower cylindrical section 42 immediately below the threaded section 44. Referring to FIGS. 5 and 6, a first slot 70 is formed within the bore 52 and extends in an axial direction between the shoulder 58 and the adjacent window 68. A second slot 72 is formed within the bore 52 at a location opposite the slot 70 and also extends between in an axial direction between the shoulder 58 and the adjacent window 68. The slot 70 is formed with a prescribed width which is centered about a horizontal centerline as viewed in FIG. 6. The slot 72 is wider than the slot 70 but is offset somewhat from the horizontal centerline as viewed in FIG. 6. As shown, the portions of both of the slots 70 and 72 above the horizontal centerline extend an equal distance. However, the portion of the slot 72 below the centerline extends considerably more from the centerline than the comparable portion of the slot 70.

Figure 2:
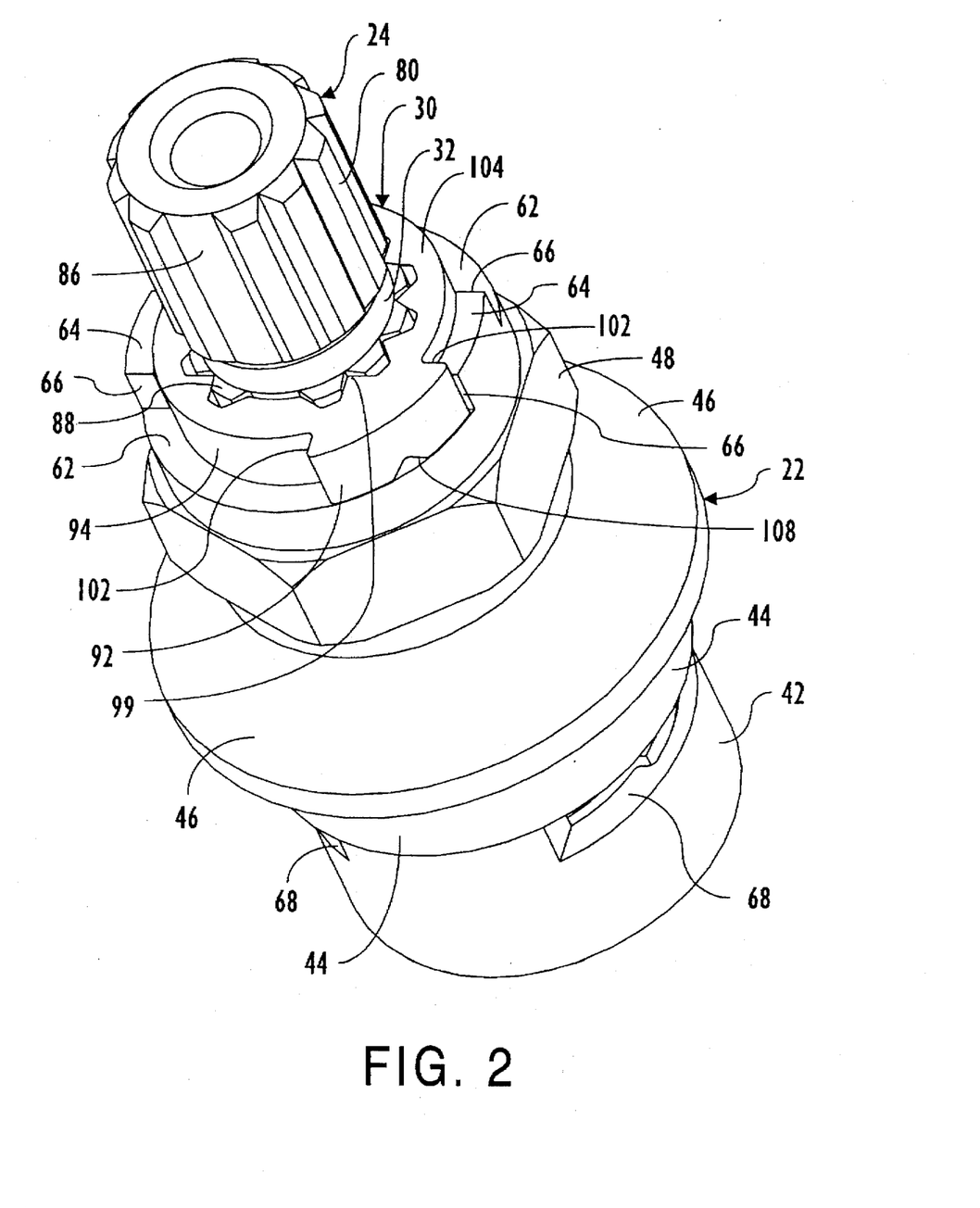
FIG. 2 is an assembled perspective view showing the valve assembly of FIG. 1 in accordance with certain principles of the invention.
Figure 7:
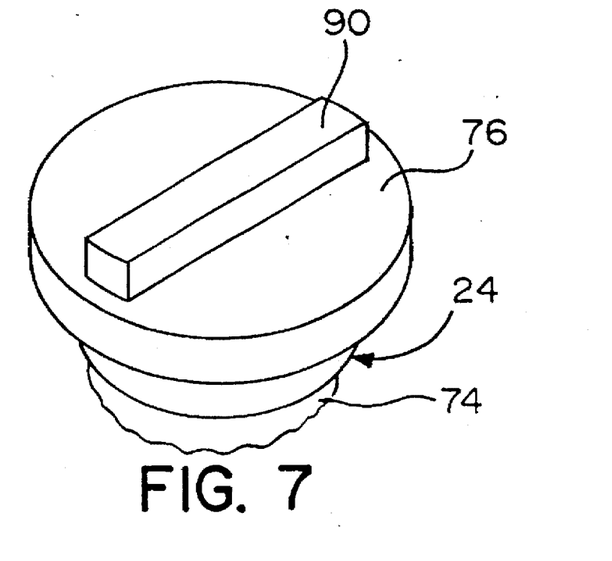
FIG. 7 is a partial perspective view showing an end of a stem of the valve assembly of FIG. 1.
Figure 11:
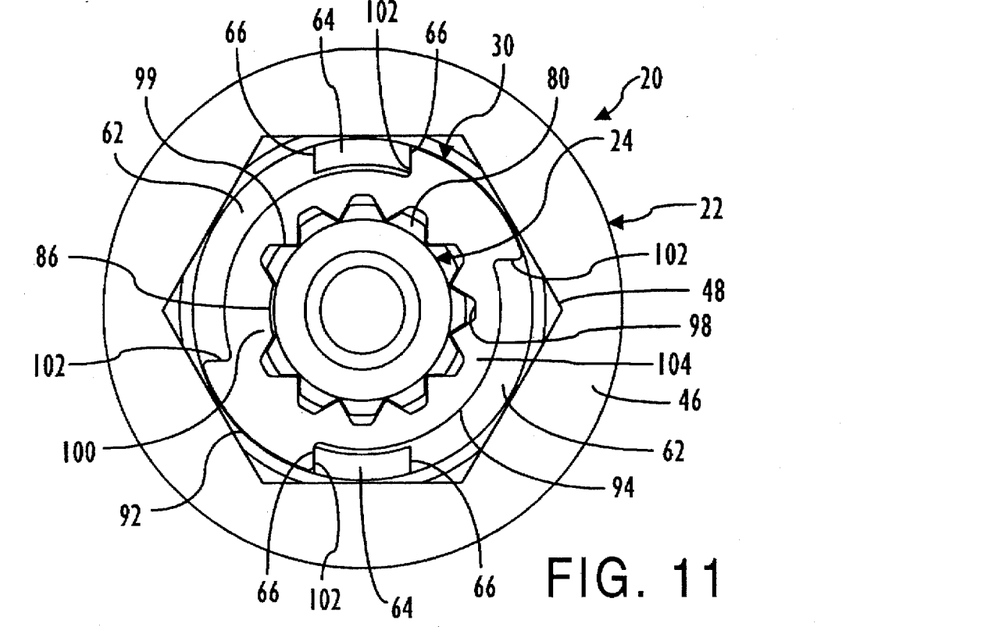
FIG. 11 is a top view of the valve assembly of FIG. 2 showing a first relation between a reversible stop on the stem of FIG. 7 and stop surfaces on the housing of FIG. 5 in accordance with certain principles of the invention.

As shown in FIG. 1, the stem 24 is formed with a shank portion 74 and a disk-like base 76 integrally joined to the lower end of the shank portion. The base 76 is formed with an upper surface 77 which is contiguous with the shank portion 74. An annular groove 78 is formed about an intermediate section of the shank portion 74 for eventual receipt of the O-ring 28. The upper end of the shank portion is formed with a first set of splines 80 and a second set of splines 82 spaced from the first set by an annular groove 84. The splines 80 and 82 extend in an axial direction and are aligned with each other. A space 86 is formed in the first set of splines 80 in an area which would normally be occupied by one of the splines. A space 88 is formed in the second set of splines 82 in an area normally occupied by one of the splines. The spaces 86 and 88 are aligned as shown in FIG. 1. As shown in FIG. 7, a drive bar 90 is formed diametrically and nearly fully across the underside of the base 76 of the stem 24. The drive bar 90 is elongated and slender and is formed with four essentially squared corners. Referring to FIGS. 1 and 2, the reversible stop 30 is formed in a disc-like, flat configuration having a pair of ears 92 extending radially outward from opposite sides of a circular body 94. The stop 30 is formed with a large axial opening 96 through the body 94 with a series of juxtaposed spaces 98 arranged radially on the inside of the opening. Each of the spaces 98 are shaped in a configuration essentially the same as the configuration of each of the splines 80 and 82 of the stem 24. A plurality of radially inward projections 99 are formed between adjacent spaces 98 and are the most radially inboard portions of the stop 30. In addition, a wide spline 100 is formed on the inside of the opening 96 of the stop 30 in radial arrangement with the spaces 98 and is shaped in essentially the same configuration as the space 86 of the stem 24. The ears 92 are each formed with a pair of stop surfaces 102. As shown in FIGS. 1, 2 and 11, a first flat major surface 104 of the stop 30 is formed without any interruptions while a second flat major surface 106, on a side of the stop opposite the first major surface, is formed with two "V" shaped grooves 108 which are aligned and on opposite sides of the opening 96. The retainer 32 is formed in a circular configuration and is composed of a compliant material such as, for example, silicone. The retainer 32 is formed with a rectangular cross section as shown in FIGS. 3 and 4, As shown in FIG. 1, the coupler 34 is formed generally in a circular configuration. The coupler 34 is composed of a plastic material such as, for example, a thermoplastic material available from DuPont under the trademark "Delrin." On a first major surface 110 of the coupler 34, four pie-shaped cutouts 112 are formed in a four-quadrant arrangement and an elongated, slender slot 114 is formed diametrically nearly fully across the surface. The slot is configured somewhat as a complementary configuration to the configuration of the drive bar 90. As shown in FIG. 1, four corners 115 of the elongated slot 114 are formed with the thermoplastic material of the coupler 34 to the extent that the corners are rounded from the top of the slot to the base thereof. In this respect, the four corners 115 of the slot 114 differ from the squared corners of the drive bar 90.

Figure 8:
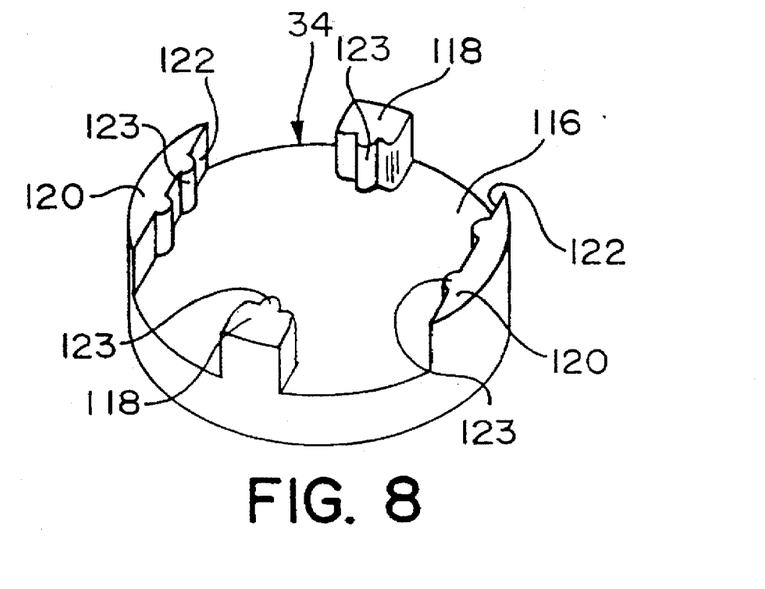
FIG. 8 is a perspective view showing structural features of one side of a coupling of the valve assembly of FIG. 1.

Referring to FIG. 8, the coupler 34 is formed with a second major surface 116 having a pair of diametrically spaced, cube-like blocks 118 extending outward from opposite edges of the side. A pair of diametrically-spaced guide members 120 are also formed on the second major surface 116 and extend outward from opposite edges of the surface. The guide members 120 are each formed with a flat surface 122 which interfaces with the flat surface of the other guide member and which are parallel with each other and with the alignment of the blocks 118. As shown in FIG. 8, a plurality of crush ribs 123 are formed on the flat surfaces 122 of the guide members 120 and on the interfacing surfaces of the blocks 118 as an integral portion of the coupler 34.

Figure 9:
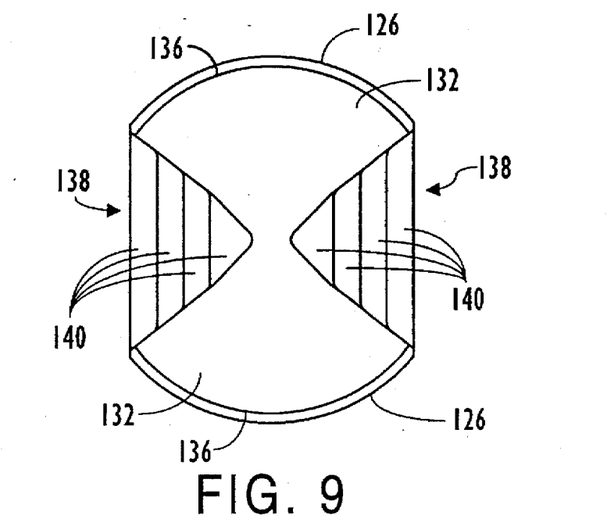
FIG. 9 is a bottom view showing structural features of a first valve element of the valve assembly of FIG. 1.

As shown in FIG. 1, the rotatable disk 36 is formed with a flat upper surface 124 with convex end surfaces 126 and spaced, parallel, straight side edges 128. A pair of notches 130 are formed centrally in each of the convex end surfaces 126 and the flat upper surface 124. Referring to FIG. 9, the rotatable disk 36 is formed with a flat bottom surface 132 having convex end edges 136 which are contiguous with the convex end surfaces 126. A pair of "V" shaped spaces 138 are formed on opposite sides of the rotatable disk 36 and are contiguous with the straight side edges 128. The spaces 138 form a pair rectangular openings on opposite sides of the disk 36 and a pair of "V" shaped opening at the bottom of the disk. A series of step surfaces 140 are formed in a ceiling of each of the spaces 138 as shown in FIGS. 3, 4 and 9.

Figure 10:
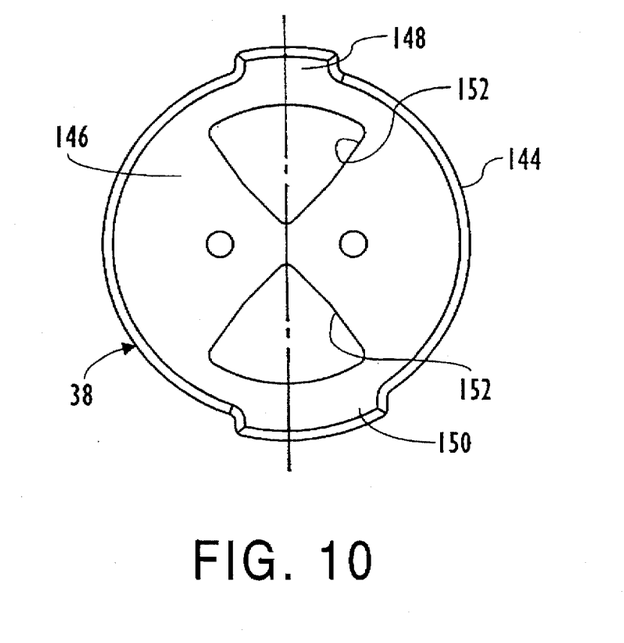
FIG. 10 is a top view showing structural features of a second valve element of the valve assembly of FIG. 1.

Referring again to FIG. 1, the fixed disk 38 is formed with a flat upper surface 142 and a circular side 144. As shown in FIG. 10, the disk 38 is formed with a flat bottom surface 146. As shown in FIGS. 1 and 10, a first ear 148 and a second ear 150 extend radially outward from opposite portions of the side 144 of the disk 38. The first ear 148 is located symmetrically about a centerline as viewed in FIG. 10 while the second ear 150 has a portion which offset to the right of the centerline. A pair of pie-shaped openings 152 are formed through the disk 36.

As shown in FIGS. 1, 3, 4 and 14, the bottom seal 40 is formed in a circular configuration with a circular groove 154 formed centrally in each side of the seal. Each of the grooves 154 of the seal 40 is formed with spaced sidewalls 156 and a base 158 which extends between the sidewalls and which faces outward of the seal. The formation of each groove 154 in the seal 40 results in an outward facing surface 160 on an outboard side of the groove and an outward surface 162 on an inboard side of the groove. Thus, the surfaces 160 and 162 are separated by the groove 154 and the surfaces 158, 160 and 162 all face in an outward direction with respect to the seal 40. The seal 40 is formed with an axial opening 164.

In the assembly of the components of the valve assembly 20 as viewed in FIGS. 3 and 4, the thrust washer 26 is positioned over the shank portion 74 of the stem 24 and is located on the upper surface of the base 76. The O-ring 28 is placed over the shank portion 74 of the stem 24 and is compliantly located in the annular groove 78 formed in the shank portion. The rotatable disk 36 is then assembled with the coupler 34 by aligning the blocks 118 of the coupler with the notches 130 of the disk. Thereafter, the coupler 34 and the disk 36 are moved relatively toward each other so that the blocks 118 move into the notches 130 and the straight side edges 128 of the disk are guided between the guide members 120 of the coupler. Eventually, the surface 116 of the coupler 34 is placed in interfacing engagement with the surface 124 of the disk 36. As the straight side edges 128 of the rotatable ceramic disk 36 is moved past the flat surfaces 122 of the coupler 34, the edges of the disk engage and deform, and essentially crush, the crush ribs 123 to the extent that the disk and the coupler fit snugly together. This facilitates and provides a tight fit between the coupler 34 and the rotatable disk 36 and precludes the tendency for lost motion between the coupler and the disk between the driving rotation of the coupler and the driven rotation of the disk.

The stem 24 is then manipulated to align, and assemble, the drive bar 90 thereof with the elongated slot 114 of the coupler 34. As the drive bar 90 is inserted into the slot 114, the metal material at the four squared corners of the bar engages and deforms, and essentially crushes, the thermoplastic material of the curved corners 115 to the extent that the bar fits snugly into the slot. This facilitates and provides a relatively tight fit between the bar 90 and the slot 114 and precludes the tendency for lost motion between the driving rotation of the stem 24 and the driven rotation of the coupler 34.

With the relatively tight fit between the bar 90 of the stem 24 and the slot 114 of the coupler 34, and between the coupler and the rotatable disk 36, as described above, there is essentially no opportunity for any lost motion in the use of the valve assembly 20. This provides a comfortable and assuring responsive feeling to the user of the valve assembly 30.

A lubricating grease is applied to the shank portion 74 of the stem 24 between, and on either side of, the thrust washer 26 and the O-ring 28. Also, grease is applied in the area of the junctures of the bottom of the stem 24 and the top of the coupler 34, the bottom of the coupler and the top of the rotatable disk 36, and the disk 36 and the fixed disk 38.

The shank portion 74 of the stem 24 is then inserted into the bore 52 of the housing 22 through lower opening 54 thereof and is moved into the bore so that the upper end of the shank portion extends outward from the upper opening 56 of the bore as shown in FIGS. 3 and 4. However, the stem 24 is not moved fully to its final position within the housing 22 at this time. Thereafter, the fixed disk 38 is positioned with the upper surface 142 thereof facing the bottom surface 132 of disk 36 and with ears 148 and 150 thereof aligned with slots 70 and 72, respectively, of housing 22. It is noted that, due to the offset configuration of the ear 150, and the corresponding offset configuration of the slot 72, the fixed disk 38 can be inserted into assembly with housing 22 only in one orientation. This feature insures that the fixed disk 38 is always assembled with the rotatable disk 36 in the proper relationship for operation of the valve assembly 20.

The fixed disk 38 is then moved into a position where the bottom surface 132 of disk 36 is in interfacing engagement with the top surface 142 of the fixed disk. During the period when the fixed disk 38 is being assembled as noted above, the assembly of the stem 24, the coupler 34 and the rotatable disk 36 remain partially positioned within the housing 22 to provide a back wall against which the fixed disk can be properly aligned within the housing as the ears 148 and 150 are being inserted into the slots 70 and 72, respectively.

Thereafter, the fixed disk 38 is pushed further into the housing 22 whereby the stem 24, the coupler 34 and the rotatable disk 36 are fully seated in their final position within the housing. In this assembly, the thrust washer 26 is sandwiched between the upper surface 77 of the stem 24 and the shoulder 60 of the housing 22. Also, the splines 80 and 82 of the stem 24 extend fully outward from opening 56 of the housing 22 in their final position.

The bottom seal 40 is then assembled within the opening 54 of the housing 22 and is pressed into engagement with the bottom surface 146 of the fixed disk 38. Lower portions of the seal 40 extend outward from the opening 54 for subsequent sealing engagement with a seat in an end body (not shown) associated with the faucet. The outer diameter of the seal 40 is slightly larger than the diameter of opening 54 of the housing 22 whereby the seal is frictionally held within the opening. This provides an assist in retaining the assembled stem 24, coupler 34, rotatable disk 36 and the fixed disk 38 within the housing. In the past, a seal used for this purpose was composed of a silicone rubber, a soft material which deflects easily but is relatively expensive. In an effort to design a replacement seal for the seal composed of silicone rubber, it was determined that a seal, such as the seal 40, could be composed of an EPDM rubber which is less costly and is sufficiently resistant to the chemicals of the water passing therethrough. However, EPDM rubber is harder and stiffer than silicone rubber and requires greater force for deflecting a given volume. If the full interfacing surface of a seal composed of EPDM rubber was placed in engagement with the fixed disk 38, the turning of the stem 24 by the user of the associated faucet would be difficult due to the area of frictional contact between the seal and the fixed disk and the spring constant of the material and geometry of the seal and the composition of the material.

Figure 14:
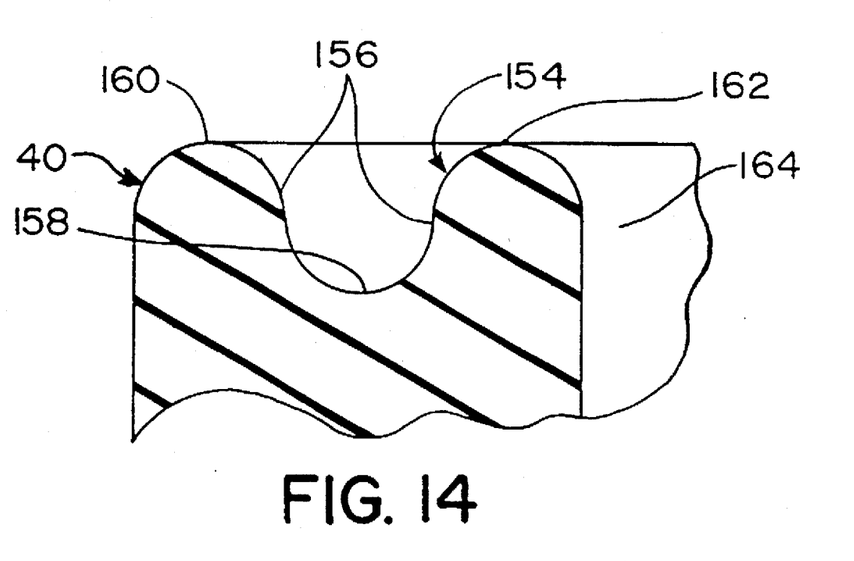
FIG. 14 is an enlarged partial sectional view of a bottom seal in accordance with certain principles of the invention.

By forming the annular groove 154 in the seal 40, only the areas of surfaces 160 and 162 engage the bottom surface 146 of the fixed disk 38 which provides a watertight seal and sufficient frictional contact to allow for easy turning of the stem 24 and disk 36 during use of the associated faucet. With this arrangement, there is less comparable material to deflect and thereby less force is required. Also, it is noted that the spaced surfaces 160 and 162 and the surface of the base 158 interface with the bottom surface 146 of the fixed disk 38. However, only the spaced surfaces 160 and 162 of the seal 40 apply a prescribed force against the bottom surface 146 of the disk 38 to allow the turning of the stem 24 and disk 36 while the seal continues to assist in retaining the assembled components within the housing 22.

The compliant retainer 32 is then stretched as it is moved over the first set of splines 80 and is compliantly placed into the annular groove 84. In this position, the radially outer portions of the retainer 32 occupy an area directly above an area which eventually will be occupied by the radially inward projections 99 of the stop 30.

The reversible stop 30 is then positioned over the upper end of the shank portion 74 of the stem 24 and is oriented so that the wide spline 100 thereof is located in alignment with the wide space 86 of the shank portion. In this position, the spaces 98 of the stop 30 are aligned with the first set of splines 80 formed at the upper end of the shank portion 74. The stop 30 is then moved over the first set of splines 80, past the retainer 32 previously assembled in the annular groove 84 and onto the second set of splines 82 whereby the wide spline 100 of the stop is located within the wide space 88 formed on the shank portion adjacent the second set of splines.

As the stop 30 is moved past the retainer 32, the radially outward portions of the retainer are compressed momentarily by the radially inward projections 99 of the stop to allow the stop to be assembled onto the splines 82. Once the stop 30 has been moved past the retainer 32, the radially outward portions of the retainer decompress and extend over the radially inward projections 99 of the stop which thereby prevents the stop from unintentionally moving outward of the stem 24 from its mounted position on the splines 82. If it is necessary to remove the stop 30, the reverse procedure is effected. By use of the retainer 32 as described above, the stop 30 can be easily and quickly removed without any special tooling and without dismantling any other components of the valve assembly 20.

In the past, and currently, manufacturers of two-handle faucets adopt a turning convention for the direction in which the respective valves are to be turned to open and close the hot water and cold water valves. For example, in one convention, when round knob-like handles or cross handles are used, both the hot water valve and the cold water valve are turned counterclockwise to open the valves and clockwise to close the valves. If a faucet employing the round or cross handles is to be converted to a lever handle faucet, the hot water valve will continue to use the convention noted above with respect to the round or cross handles. However, the cold water valve must now be turned clockwise to open the valve and counterclockwise to close the valve. Therefore, the reversible stop 30 must be removed and manipulated to accommodate the lever handle convention in accordance with certain principles of the invention. Other conventions could be used with the round or cross handles, and with the lever handles, which could utilize the reversible stop 30 as described and claimed herein without departing from the spirit and scope of the invention.

If the valve assembly 20 is to be assembled with a two-handle faucet using round or cross handles for controlling both the hot water side and the cold water side, the stop 30 is assembled as shown in FIGS. 2 and 11 with the plain-side surface 104 facing up and the ears 92 being located to the clockwise right of the tabs 64. In this arrangement, the illustrations of FIGS. 2 and 11 depict an open valve whereby the spaces 138 of the rotatable disk 36 are aligned with the pie-shaped openings 152 of the fixed disk 38. Water will flow through the opening 164 of the seal 40, through the openings 152 of the fixed disk 38, through the spaces 138 of the rotatable disk 36 and through the windows 68 formed in the housing 22. When the stem 24 is turned clockwise to the extent permitted by the tabs 64 and ears 92, the valve will be closed whereby the spaces 138 of the rotatable disk 36 are moved so that no portions of the spaces overlap with any portions of the pie-shaped openings 152 of the fixed disk 38. It is noted that the extreme limit positions for turning the valve from fully closed to fully open allows the stem 24 and rotatable disk 36 to be turned approximately one quarter of a full revolution.

Figure 12:
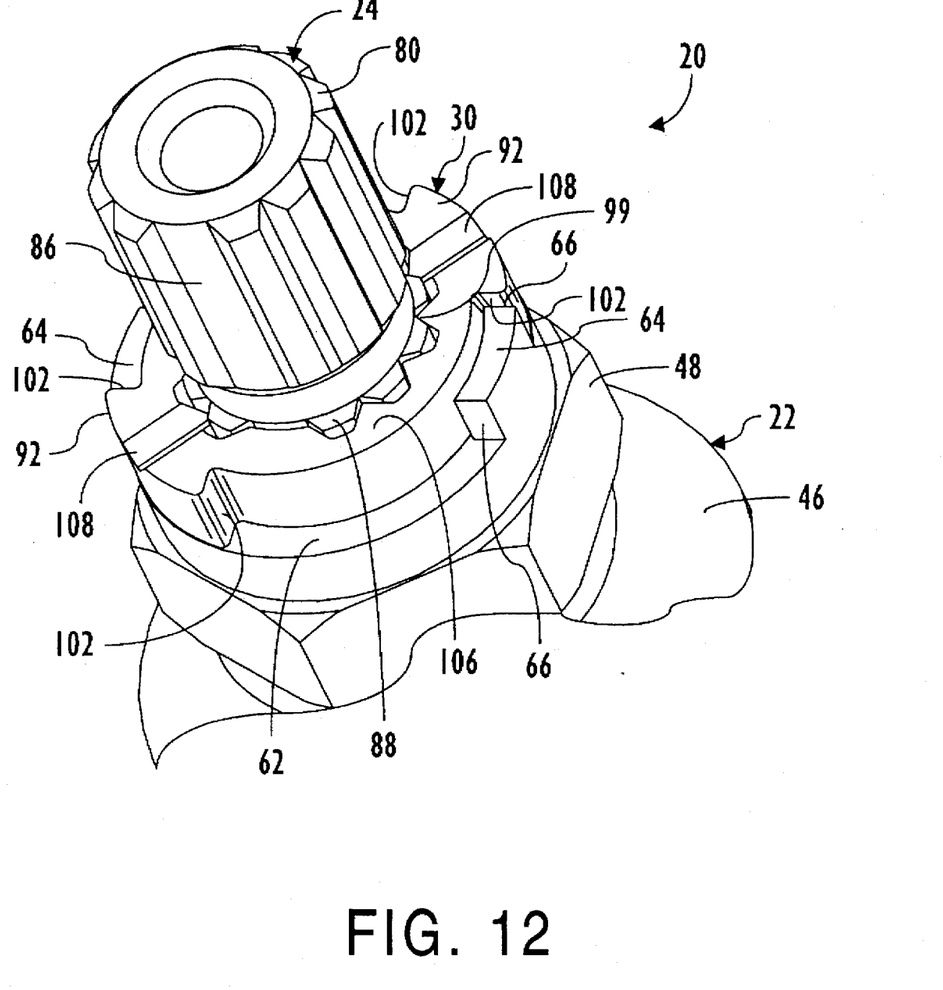
FIG. 12 is a partial perspective view of the valve assembly of FIG. 1 showing a second relation between the reversible stop and the stop surfaces of FIG. 11 in accordance with certain principles of the invention.
Figure 13:
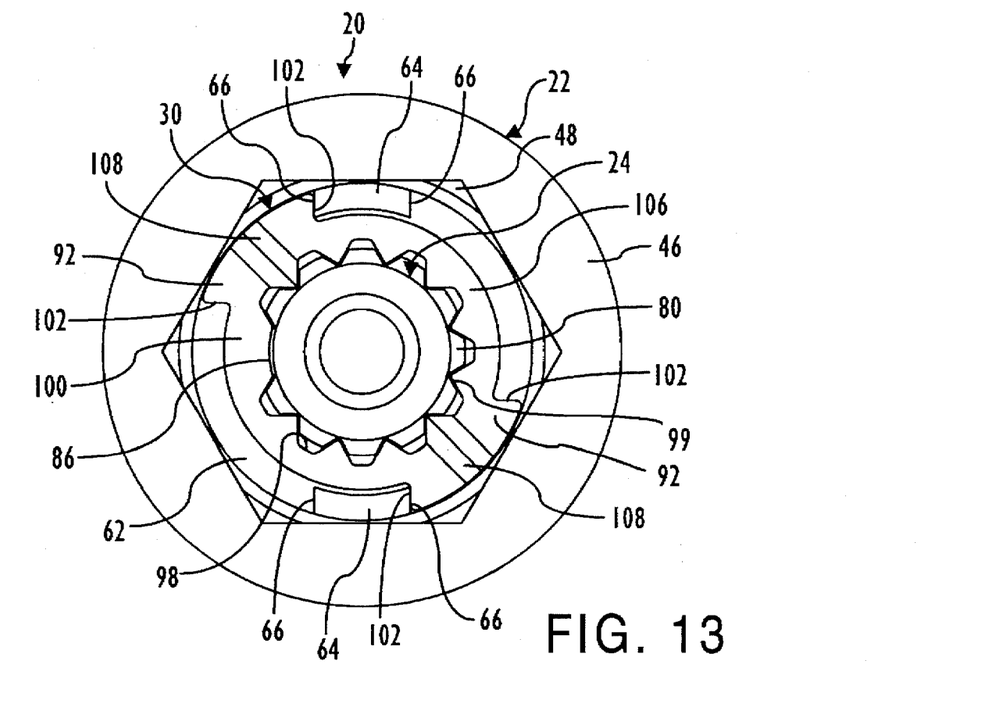
FIG. 13 is a top view of the valve assembly of FIG. 1 showing the second relation between the reversible stop and the stop surfaces of FIG. 12 in accordance with certain principles of the invention.

When the faucet described above is to be converted from a round handle or a cross handle to a lever handle, an installer removes the round or cross handle from atop the stem 24 of the hot water valve assembly 20 and replaces the handle with a lever handle. With respect to the cold water valve assembly 20, the round or cross handle is removed by the installer from atop the stem 24 to expose the reversible stop 30. The stop 30 is then gripped by the installer and easily removed as described above without the use of any tools and without removing any other component of the valve assembly 20. The installer then flips the stop 30 over so that the surface 106 is facing upward and the wide spline 100 of the stop is in alignment with wide spaces 86 and 88 of the stem 24. The stop 30 is then reinserted onto the splines 80, biasingly past the retainer 32 and onto the splines 82 whereby the ears 92 are located to the counterclockwise left of the tabs 64 as viewed in FIGS. 12 and 13. The position of the stop 30 in FIGS. 12 and 13 represent a fully open valve. By turning the stem 24 in a counterclockwise direction as viewed in FIGS. 12 and 13, the valve will be closed.

When the stop 30 is flipped over as described above, the grooves 108 will appear and, when the stop is reinserted, will provide indication that the components of the valve assembly 20 have been assembled in an orientation to be used as a cold water valve with a lever handle under the convention described above. Of course, the stop 30 could be assembled initially at the factory for use with a lever handle where the upwardly facing grooves 108 provide indication to the factory people of the intended use as well as providing indication to the ultimate on-site installer of the faucet. This feature is also an advantage to the do-it-yourselfer who installs and completes such conversion projects without the need for professional assistance. Further, plumbers and installers who are working on tract projects involving multiple houses have a limited time in which to accomplish plumbing installations. The indicating feature of the stop 30 and the ease of removal and reversal thereof without the need for any tooling or dismantling other components of the valve assembly 20 provide the opportunity for the replacement and/or installation process to be accomplished in relatively short periods of time.

As noted above, the premise of providing an indicating structure, such as, for example, the grooves 108, on one side of the stop 30 could be used with other valve-turning-direction conventions for turning the valves of a two handle faucet without departing from the spirit and scope of the invention.

In general, the above-identified embodiment is not to be construed as limiting the breadth of the present invention. Modifications, and other alternative constructions, will be apparent which are within the spirit and scope of the invention as defined in the appended claims.

What is claimed is:

1. A valve assembly, which comprises:

a housing having a bore therethrough;

a stem mounted within the bore of the housing for free rotation relative thereto;

a first end of the stem extends axially outward from a first opening of the bore of the housing;

a first fluid-flow valve element located within the bore of the housing and coupled to a second end of the stem for rotation therewith;

a second fluid-flow valve element fixedly attached within the bore of the housing adjacent a second end of the housing;

the bore of the housing formed with a second opening at the second end of the housing and having a second-opening wall which is formed with a prescribed diameter;

the first valve element is formed with a surface which is in facing engagement with a first surface of the second valve element;

a retainer assembled within the second opening of the bore of the housing and formed with a diameter greater than the prescribed diameter which provides a frictional securance of the retainer within the second opening sufficient to preclude any axial movement of the stem, the first valve element and the second valve element from within the housing and through the second opening; and the retainer formed with means which interfaces with a second surface of the second valve element with only a portion of the interfacing means in engagement with the second surface of the second valve element for applying a prescribed force against the second surface of the second valve element and for thereby allowing the turning of the stem and the first valve element relative to the second valve element while the retainer precludes axial movement of the stem, the first valve element and the second valve element outward through the second opening of the bore of the housing.

2. The valve assembly as set forth in claim 1, wherein the structure of the retainer includes a first surface in interfacing engagement with the second surface of the second valve element and a second surface interfacing the second surface of the second valve element and spaced therefrom.

3. The valve assembly as set forth in claim 1, wherein the structure of the retainer comprises:

a first surface located in a plane and facing in a prescribed direction;

a second surface located in the plane and spaced from the first surface and facing in the prescribed direction; and a third surface located in a space between the first and second surfaces out of the plane thereof inboard of the retainer and facing in the prescribed direction.

4. The valve assembly as set forth in claim 3, wherein the third surface is a base surface of a groove formed between the first and second surfaces.

5. The valve assembly as set forth in claim 1, wherein the retainer comprises:

a compliant band having an axial opening formed therethrough and a side adjacent one end of the opening in a plane generally perpendicular an axis of the opening;

a first surface formed on the side and facing in a prescribed direction;

a second surface formed on the side and facing in the prescribed direction;

a groove formed between the first and second surfaces having a base surface spaced inboard of the retainer from the first and second surfaces and facing in the prescribed direction.

6. A valve assembly, which comprises:

a housing having a bore therethrough;

a stem mounted within the bore of the housing for free rotation relative thereto;

a first end of the stem extends axially outward from a first opening of the bore of the housing;

a first fluid-flow valve element located within the bore of the housing and coupled to a second end of the stem for rotation therewith;

a second fluid-flow valve element fixedly attached within the bore of the housing adjacent a second end of the housing;

the bore of the housing formed with a second opening at the second end of the housing and having a second-opening wall which is formed with a prescribed diameter;

the first valve element is formed with a surface which is in facing engagement with a first surface of the second valve element;

a compliant seal having an axial opening therethrough and formed with an outer diameter which is greater than the prescribed diameter assembled frictionally within the second opening of the housing to preclude axial movement of the first and second valve elements and the stem outward from the second opening of the bore; and the compliant seal formed with means which interfaces with a second surface of the second valve element with only a portion of the interfacing means in engagement with the second surface of the second valve for forming a fluid seal at the juncture of the compliant seal and the second surface of the second valve element.

* * * * *